July 29, 1969   C. E. BOHNSTEDT ET AL   3,458,794
RECHARGEABLE DEVICE WITH ROTATABLE PLUG
Filed June 7, 1967   2 Sheets-Sheet 1

WITNESSES
Helen M. Barkas
James F. Young

INVENTORS
Charles E. Bohnstedt,
George H. Russell & Harold F. Yoos
BY
H Samuel Oddi
ATTORNEY

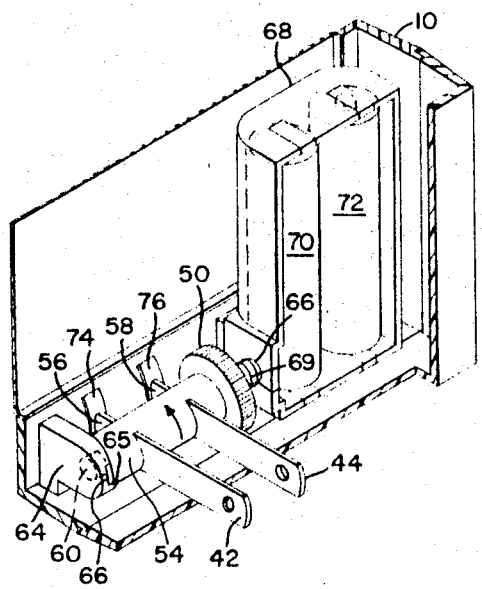

United States Patent Office 3,458,794
Patented July 29, 1969

3,458,794
RECHARGEABLE DEVICE WITH ROTATABLE PLUG
Charles E. Bohnstedt, Somerset, George H. Russell, Metuchen, and Harold F. Yoos, Mount Holly, N.J., assignors to Westinghouse Electric Corporation, Pittsburgh, Pa., a corporation of Pennsylvania
Filed June 7, 1967, Ser. No. 644,392
Int. Cl. H02j 7/02; H01r 3/00
U.S. Cl. 320—2       8 Claims

ABSTRACT OF THE DISCLOSURE

The present disclosure relates to a rechargeable device operative with rechargeable batteries and including a recharging unit within the housing of the device. A pair of electrical plug blades are secured to a drum which is rotatable within the housing, with the plug blades passing through apertures in the housing of the device to appear externally thereof for insertion into an electrical outlet to recharge the rechargeable batteries. The plug blades are rotatable with the drum back into the housing when the device is to be placed in its normal operating condition, with the batteries supplying normal operating power therefor.

Background of the invention

The present invention relates to rechargeable devices and, more particularly, to rechargeable devices including integral recharging units.

A large number of electrically driven or operating devices are available on the market which utilize rechargeable batteries as the power source therefor. Among these devices are transistorized radios, tape recorders, electric tooth brushes, flashlights, phonograph record players, cigarette lighters, and a wide range of other devices. The recharging of the rechargeable batteries is accomplished either by a separate recharging unit or with a recharging unit which comes with the device either as an integral part thereof or as an optional feature for separate purchase. A common practice with devices that have their own rechargeable unit is to have this unit detachable from the device itself so the device and the recharging unit are engaged only during the recharging operation. This has the disadvantage of not having the recharging unit immediately available when needed, and also of storing the recharging unit when the device is in operation. Other rechargeable devices have integral recharging units, however, due to their particular design, it is necessary that the unit be somewhat disassembled in order to accomplish the recharging operation by extracting an electrical plug and cord therefrom for insertion into electrical outlets. The requirement for an extractable electrical outlet cord and plug, of course, adds to the size and weight of the rechargeable unit, thereby detracting from its portability. Moreover, to set up the device and recharge its batteries may also be a cumbersome and time consuming operation.

Summary of the invention

It is therefore an object of the present invention to provide a new and improved rechargeable device operative with rechargeable batteries and including therein a recharging unit. An electrical plug is rotatably mounted within the device so that the plug may be rotated exteriorly of the device to be inserted into an electrical output, with the recharging unit being activated thereby and the rechargeable device being supported thereby. The electrical plug is rotatable back within the device whenever the device is to be placed in its operative condition for operation on the rechargeable batteries.

Brief description of the drawing

FIG. 3 is a cut-away pictorial diagram showing the electrical plug assembly in its recharging position;

FIG. 4 is a pictorial diagram showing the electrical plug assembly in its operating position; and FIG. 5 is a schematic diagram of the schematic-block diagram circuitry adaptable for use in the present invention.

Discussion of the preferred embodiment

Figure 1:
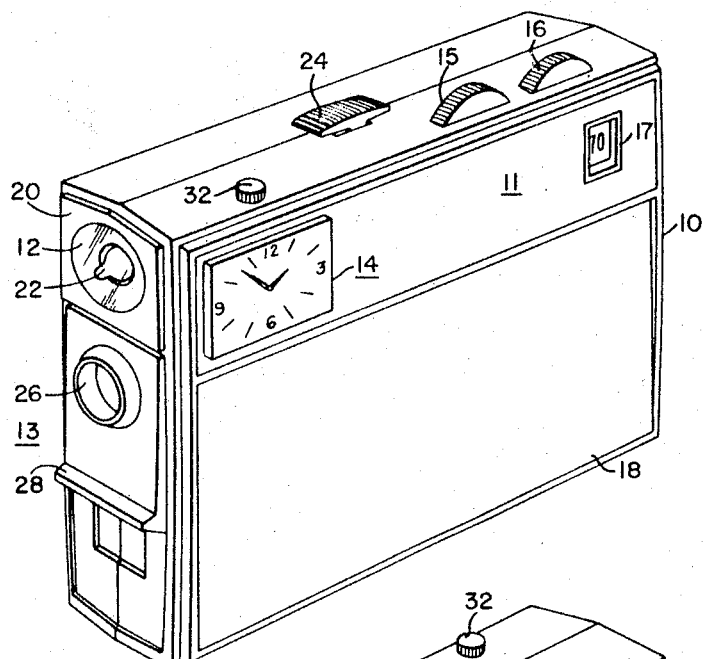
FIGURE 1 is a front pictorial view of a rechargeable device in which the present invention may be utilized.

Referring now to FIG. 1, a device operative on rechargeable batteries and in which the present invention may be practiced is shown. This device is shown to include a housing 10. Disposed within the housing 10 is the necessary circuitry for a radio 11, a flashlight 12 and a cigarette lighter 13 all of which are operative from rechargeable batteries and a clock 14 which may either be the wind-up type or battery driven. An ON-OFF volume control knob 15 is provided for the radio 11 and a tuning control knob 16 is also provided therefor, with indication of the station to which the radio is tuned appearing in a tuning window frame 17. The speaker for the radio 11 is disposed behind a speaker grill 18 in the front portion of the housing 10. The flashlight 12 is disposed in one end of the housing 10 and includes a frame member 20 having its aperture in the center thereof wherein a flashlight bulb 22 is disposed. A flashlight ON-OFF button 24 is disposed in the top surface of the housing 10 and serves to turn the flashlight on and off. An electrically operated cigarette lighter 13 is also provided on the side surface of the housing 10, with the lighter including a cigarette receiving orifice 26 and a slide knob 28. The cigarette receiving orifice 26 is normally closed with the cigarette lighter unactivated. By pressing the lighter knob 28 in a downward direction the orifice is opened and an electrical heating coil is activated so that when a cigarette is placed in the orifice it will be lighted by the heat provided by the electrical coil. The clock 14 is disposed in the front surface of the housing 10, with a watch stem 32 being provided therefor for the setting of this watch, which may either be mechanically or electrically driven.

Figure 2:
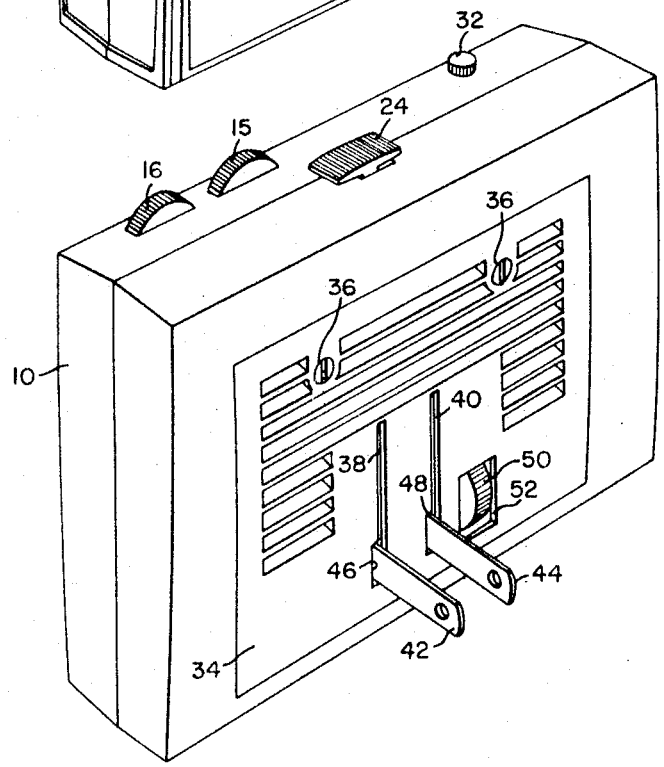
FIG. 2 is a back pictorial diagram of the rechargeable device of the present invention with the electrical plugs extended.

FIG. 2 shows the back portion of the device of FIG. 1 and illustrates the rotatable electrical plug of the present invention. The housing 10 incldues a back portion 34 which completes the housing and is secured thereto by screws 36. In the back portion 34 is provided a pair of slots 38 and 40. A pair of electrical plug blades 42 and 44 are disposed, respectively, within the slots 38 and 40 and are shown in a rotated position outwardly of the housing 10 which will be termed herein the "recharging position." The pair of electrical plug blades 42–44 may comprise a standard electrical plug adapted to be inserted into a standard electrical output. The slots 38 and 40 respectively each have a notched portion 46 and 48 at the bottom end thereof. Thus, by a slight lateral movement of the electrical blades 42–44, they will fit into the notch portions 46 and 48 and be secured thereby. By then inserting the blades 42 and 44 into a standard electrical outlet, the entire device will be supported thereby for recharging over a period of time.

A thumb wheel 50 appears in an aperture 52 of the back portion 34 of the housing 10. The thumb wheel 50 is coupled to the pair of blades 42–44 for the rotation and lateral movement thereof as will now be explained.

FIG. 3 shows a cut-away view of the device of FIG. 2 better illustrating the rotatable drum assembly which carries the electrical blades 42 and 44. As can be seen in FIG. 3, the electrical blades 42 and 43 pass through a drum 54 which comprises an electrically insulating material. The back ends 56 and 58 of the blades 42 and 44, respectively, extend through the drum 54. The thumb wheel 50 is secured to the right end of the drum 54 and is mechanically coupled thereto and may in actual embodiment form a part of the drum 54 itself. Thus, as the thumb wheel 50 is rotated the drum 54 and blades 42–44 rotate therewith. The drum assembly includes an axle portion 60 at the left side thereof, which fits into a slot 62 of a support member 64 that forms an internal portion of the housing 10. The drum 54 includes a notch portion 65 adjacent to the axle 60, which acts to engage the support member 64 when the drum is placed in the recharging position and thereby hold the drum assembly in position with the blades 42 and 44 extending out of the housing 10. An axle portion 66 is provided at the right end of the drum assembly and fits into an aperture in a battery carriage 68. A spring 69 is disposed over the axle 66 between the end of the thumb wheel 50 and the carriage 68 to spring load the drum assembly. The battery carriage 68 is secured to the housing 10, by for example bolts. Disposed within the battery carriage 68 are batteries 70 and 72, which are the rechargeable type. The batteries 70 and 72 may be of any standard voltage output to meet the requirements of the particular circuitry or mechanism being utilized within the device. Contact members are provided at the ends of the batteries 70 and 72 as is well known in the art.

The drum 54 is thus rotatably mounted within the housing 10 so that by turning the thumb wheel 50 it will rotate therewith against the force of the spring 69. The electrical blades 42 and 44 rotate from within the housing through the slots 38 and 40 to appear externally of the housing as shown in FIGS. 2 and 3, so that the plug blades 42 and 44 may be inserted into a wall outlet. The spring loaded drum 54 moves laterally as placed in the recharging position, with the notched portion 65 of the drum 54 engaging into the support member 64 to secure it in this position. The blades 42 and 44 engage in the notched portions 46 and 48 of the slots 38 and 40 and thereby lock these blades 42 and 44 in the recharging position.

FIG. 3 shows the device in the recharging position with the ends 56 and 58 of the blades 42 and 44 engaging, respectively, a pair of spring contacts 74 and 76. The spring contacts 74 and 76 are, respectively, suspended in cantilever fashion from inside of the housing 10. When the drum 54 is placed in the recharging position, the ends 56 and 58 respectively engage the spring contacts 74 and 76 to provide good electrical contact therethrough so that the alternating current which is supplied to the blades 42 and 44 from an AC outlet are translated through the contacts 74 and 76 to the recharging unit of the device.

FIG. 4 shows the device in the "operating position" with the blades 42 and 44 being rotated within the housing 10 and the ends 56 and 58 of the blades 42 and 44 being disconnected from the spring contacts 74 and 76. To accomplish this, the blades 42 and 44 are translated laterally to disengage from the notched portions 46 and 48 of the slots 38 and 40 through the thumb wheel 50. Then the thumb wheel 50 is rotated to cause the blades 42 and 44 to rotate therewith through the slots 38 and 40 into the housing to be completely out of the way for operation of the device. The rotation of the drum 54 is aided by the spring 69 which tends to return the drum to the operating position automatically. With the device in its operating position the radio 11, flashlight 12 or cigarette lighter 13 may be driven by the batteries 70–72 by the suitable closing of the respective switches for these electrical devices.

FIG. 5 shows a schematic-block diagram of the plug assembly of the recharging unit and the additional electrical devices to be energized by the rechargeable batteries 70–72. In FIG. 5, the circuit as shown is for the recharging position of the device, with the electrical blades 42–44 inserted into an electrical outlet, and the ends 56 and 58 of the electrical blades 42 and 44 contacting the spring contacts 74 and 76. The spring contacts 74 and 76 are connected to the AC input of a recharging unit indicated by a dotted box 80. The AC input of the recharging unit 80 comprises the primary winding 82 of a transformer 84. The secondary winding 86 of the transformer 84 is connected across the fullwave rectifying diode bridge 88. The fullwave rectified output of the diode bridge 88 appears as the DC output of the recharging unit 80 at leads 90 and 92. The lead 90 is connected to the positive electrode of the batteries 70–72, and the lead 92 is connected to the negative electrode of batteries 70–72. The radio circuitry 11 is connected across the batteries 70–72 through ON-OFF switch 15. The bulb 22 of the flashlight unit 12 is connected across the batteries 70–72 via its ON-OFF switch 24 and a heating coil 94 of the lighter unit 13 is connected across the batteries 70–72 via its switch 28. The switches 15, 24 and 28 are all shown in the open condition while the batteries 70 and 72 are being recharged. However, it is possible that these devices could be utilized if desired while recharging. Also various ganged switch arrangements could be utilized for the combined operation of these devices if desired.

Thus, in the recharging operation of the batteries 70–72, alternating current is supplied from an electrical outlet via the electrical blades 42–22 thereof to the spring contacts 74–76 when the drum 54 is placed in its recharging position as shown in FIGS. 2, 3 and 5. The spring contacts 74 and 76 being connected across the primary winding 82 of the input transformer 84 cause an alternating current output to appear across the secondary winding 86 of a suitable potential for charging the batteries 70–72. The alternating current at the secondary winding 86 is then fullwave rectified in the diode bridge 88 to appear as a DC output at the leads 90 and 92, with the lead 90 being positive with respect to the lead 92. Therefore, charging current will be supplied from the lead 90 to the positive electrodes of the batteries 70–72 to recharge these batteries. The return path is provided from the negative electrode to the negative lead 92 of the diode bridge 88. Thus, the batteries 70–72 will be recharged due to unidirectional current supplied thereto from the recharging unit 80 over a period of time until the batteries reach the desired charge level.

To place the device into its operating position, as shown in FIGS. 1 and 4, the electrical blades 42–44 are removed from the wall electrical output and then are translated out of the notched portions 46 and 48 of the slots 38 and 40, respectively, by the thumb wheel 50. Then the blades 42–44 are rotated via the thumb wheel 52 back into the housing 10 of the device for storage therein. The rotation of the blades 42 and 44 causes the ends 56 and 58 thereof to be disengaged from the respective spring contacts 74 and 76. Thus, with the A.C. input to the recharging unit 80 being disconnected, the batteries 70–72 become the operating source for the radio 11, flashlight 12 or lighter 13, as shown in FIG. 5, with the selective closing of respective switches 15, 24 or 28. It should be noted that the diodes of the diode bridge 88 are so poled to prevent the discharge of the batteries 70–72 there through when the alternating input is removed from the recharging unit 80.

After the batteries 70–72 have been run down due to the use of the radio 11, the flashlight 12 or the lighter unit 13, these batteries may again be recharged by rotating the blades 42-44 from housing 10, through the slots 38 and 40 and inserting the blades 42–44 into an electrical output. The lateral translation of the blades 42 and 44 into the notched portions 46 and 48 holds the blades in place so that the device will support itself within the electrical outlet.

Although the present invention has been described with a certain degree of particularity, it should be understood that the present disclosure has been made only by way of example and that numerous changes in the details of construction and the combination and arrangement of parts and elements can be resorted to without departing from the spirit and scope of the present invention.

We claim as our invention:

1. A rechargeable device operative with a rechargeable battery comprising:
   a housing including at least one aperture to the exterior thereof;
   a battery operated unit disposed within said housing;
   means for selectively electrically connecting said battery operated unit and said rechargeable battery for operation thereof;
   a recharging unit for converting A.C. to D.C. for recharging;
   a drum rotatably mounted within said housing—
   a pair of electrical plug blades secured to said drum and rotatable therewith, said blades adapted to be inserted into an electrical outlet;
   means for rotating said drum and blades between an operating position with said blades being disposed within said housing and a recharging position with said blades passing through said aperture to appear externally of said housing for insertion into an electrical outlet;
   means for electrically connecting the D.C. output of said recharging unit to said rechargeable battery;
   a pair of contacts disposed in said housing;
   means for electrically connecting said contacts to the A.C. input of said recharging unit; and
   said pair of plug blades making electrical contact with said contacts when said drum is placed in said recharging position and being electrically disconnected from said contacts when said drum is placed in said operating position.

2. The device of claim 1 wherein:
   said device being self-supportable when said pair of electrical plug blades are inserted into an electrical outlet.

3. The device of claim 1 wherein:
   said means for rotating said drum including a thumb wheel secured to said drum and extending externally of said housing to permit a user to rotate between said operating and recharging positions.

4. The device of claim 3 wherein:
   said drum including a notched portion thereon for positioning said drum in said recharging position.

5. The device of claim 3 wherein:
   said housing including a pair of slot apertures therein adapted to permit the passage of said pair of blades respectively therethrough, each of said slot apertures including a notched portion thereon for locking each of said pair of blades in position when said pair of blades are placed in said recharging position, 6. The device of claim 5 wherein:
   said contacts comprising spring contacts.

7. The device of claim 6 wherein:
   said pair of blades each including an outlet end for insertion into an electrical outlet and a contact end;
   said drum comprising an electrically insulating material and said pair of blades passing therethrough with said outlet and contact ends extending from opposite sides thereof; and
   each of said contact ends of said pair of blades engaging the respective one of said pair of spring contacts to make an electrical connection therebetween when said drum is placed in said recharging position and being disconnected from said spring contacts when said drum is placed in said operating position.

8. The device of claim 7 including:
   spring means for spring loading said drum with said spring means aiding the lateral movement of said drum and tending to return said drum to said operating position when removed from said recharging position.

References Cited

UNITED STATES PATENTS

| | | | |
|---|---|---|---|
| 2,995,695 | 8/1961 | Reich | 320—2 |
| 3,028,535 | 4/1962 | McCarthy | 320—2 |
| 3,277,271 | 10/1966 | Hunt | 219—268 |
| 3,344,334 | 9/1967 | Rubin | 320—2 |
| 1,251,471 | 1/1918 | Brooks | 339—195 X |

JOHN F. COUCH, Primary Examiner

S. WEIMBER, Assistant Examiner

U.S. Cl. X.R.

339—34, 147